United States Patent Office 2,941,286
Patented June 21, 1960

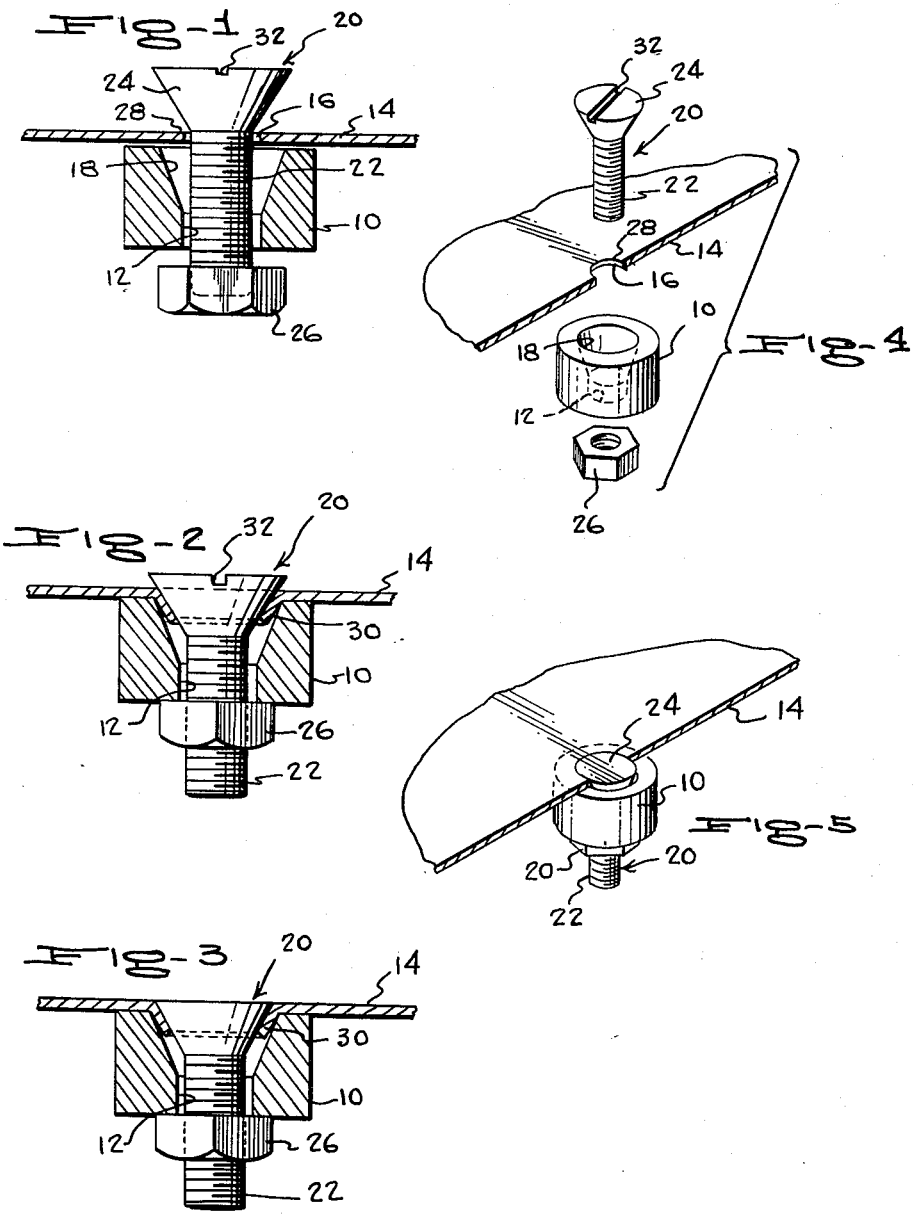

2,941,286

METHOD FOR FILLING A HOLE IN METAL SHEETING

Daniel Wory, 3074 Sylvan Road, Ambridge, Pa.

Filed Mar. 29, 1957, Ser. No. 649,422

3 Claims. (Cl. 29—401)

The present invention relates to a method for filing a hole in metal sheeting such as an automobile body.

An object of the present invention is to provide a method for filling a hole in an automobile body, such as a hole left after the removal of ornamental trim strips or pieces, which lends itself to redecoration and customizing of an automobile body, one which is rapid in action requiring no special tools, and one which does not substantially alter the area of the body surrounding the hole.

Another object of the present invention is to provide a method for filling a hole in any installed rigid and bendable metal sheeting without soldering, welding, use of acids or use of flux, and without destroying the finish of the sheeting in the area surrounding the hole and leaving the area surrounding the hole in a condition for undercoating and painting.

A further object of the present invention is to provide a method for filling a hole in installed metal sheeting which is highly efficient and economically feasible.

These and other objects and advantages of the present invention will be fully apparent from the following description when taken in connection with the annexed drawing, in which:

Figure 1 is a sectional view of the plug assembly, showing the first step in filling the hole in a section of metal sheeting;

Figure 2 is a sectional view similar to Figure 1, showing the second step in the method;

Figure 3 is a similar sectional view to Figures 1 and 2, showing the plug assembly after the final step in its installation;

Figure 4 is an isometric exploded view of the components used in the method according to the present invention; and Figure 5 is an isometric view partially in section showing the assembly of Figure 3.

In carrying out the method of the present invention for filling a hole in installed metal sheeting, the following steps are taken. A forming element, such as a collar 10 having a bore 12 extending therethrough from one end to the other end thereof, is first positioned so that one end of the element, or collar 10, is adjacent one face of the sheeting, designated by the reference numeral 14, with the bore 12 in registry with the hole 16 in the sheeting 14. The bore 12 is of a diameter greater than that of the hole 16 with the part of the bore 12 adjacent the one end of the collar 10 being of inverted frusto-conical shape, as at 18 in Figure 1.

The next step comprises inserting through the hole 16 in bore 12 a bolt 20 having a shank 22 and an inverted frusto-conically shaped head 24 of a cross-sectional area larger than that of the hole 16. The bolt 20 is so positioned that the head 24 is adjacent the other face of the sheeting 14 with the shank 22 extending through the hole 16 and the bore 12 of the collar 10. The portion of the shank 22 adjacent the end of the bolt 20 remote from the head 24 projects beyond the collar 10 when so positioned.

A nut 26 is next threadedly engaged on the projecting end portion of the shank 22, and by turning up the nut 26, a drawing force is applied to the projecting end portion of the shank 22 of a magnitude such as to cause the bolt head 24 to bear against the bounding wall 28 of the sheeting 14 adjacent the hole 16 with enough pressure to draw the portion of the sheeting 14 adjacent the bounding wall 28 into the adjacent frusto-conical shaped part of the bore 12 of the collar 10. The portion of the sheeting 14 adjacent the bounding wall 28, when drawn into the adjacent part of the bore 12, forms the sheeting skirt for the frusto-conical bolt head 24.

The next and final step comprises leveling, by filing or abrading away, a part of the bolt head 24 which projects exteriorly of the face of the sheeting 14 opposite to the face against which abuts the collar 10 so that the remaining part of the bolt head 24 is flush with the sheeting face and may be painted to match the surrounding area of the sheeting 14.

As seen in Figures 1 to 3, inclusive, the inverted frusto-conical part 18 of the bore 12 is of a larger cross-sectional area than that of the bolt head 24 and the walls of such part are disposed at a lesser angle with respect to the axis of the bore 12 than the angle of the surface of the frusto-conical part of the bolt head 24 with respect to the longitudinal axis of the bolt 20. This difference in angularity provides sufficient space for the seating skirt, designated by the reference numeral 30 in Figures 2 and 3, so that the engagement of the bolt head 24 with the skirt 30 and the skirt 30 with the part 18 of the wall and the bore 12 will be a line contact adjacent the extreme end of the bolt 24 when the latter is filed flush with the sheeting surface. Frequently, when a hole is drilled in a metal sheeting, such as an automobile body, metal adjacent the hole is upset slightly and enough to effect a thickening of the bounding wall of such hole. The space provided by the difference in angularity of the frusto-conical bore part 18 and the frusto-conical part of the bolt head 24 enables such a thickened bounding wall of such a hole to be accommodated therein without treatment by filing or abrading to remove the upset metal.

It will be seen, therefore, that the method for filling a hole in installed metal sheeting, such as an automobile body, enables an individual to quickly and efficiently fill such a hole without the use of any tools other than a wrench for the nut 26 and a screwdriver for the slot 32 provided in the bolt head 24, as shown in Figures 1, 2, and 4.

A further advantage of the method of the present invention is that such hole 16 in the metal sheeting 14, although deformed by forming the skirt 30, is not otherwise altered and if it is desired to replace on the automobile body the removed chromium trim, such hole 16 has not been filled with solder or otherwise altered.

What is claimed is:

1. The method for filling a hole in installed metal sheeting, which comprises positioning a forming element having a bore extending therethrough from one end to the other end thereof so that one end of the element is adjacent one face of said sheeting with the bore in registry with said hole, the bore of said element being of a diameter greater than said hole, inserting in said hole a bolt having a shank and a head of cross-sectional area larger than said hole on one end thereof so that the head is adjacent the other face of said sheeting with the shank extending through said hole and the bore of said element and having the portion of the shank adjacent the other end projecting beyond said element, applying a drawing force to the projecting other end portion of said shank of a magnitude such as to cause the bolt head to bear against the bounding wall of said hole and draw the portion of said sheeting adjacent said hole bounding wall into the adjacent part of said bore of said forming element and form a seating skirt for only a part of said bolt head, and providing a part of said bolt head extending exteriorly of the other face of said sheeting, and abrading away the part of said head exteriorly of the other face of said sheeting so that it is flush with said other sheeting face.

2. The method for filling a hole in installed metal sheeting, which comprises positioning a forming element having a bore extending therethrough from one end to the other end thereof so that one end of the element is adjacent one face of said sheeting with the bore in registry with said hole, the bore of said element being of a diameter greater than said hole, inserting in said hole a bolt having a shank and an inverted frusto-conically shaped head on one end thereof so that the head is adjacent the other face of said sheeting with the shank extending through said hole and the bore of said element and having the portion of the shank adjacent the other end projecting beyond said element, applying a drawing force to the projecting other end portion of said shank of a magnitude such as to cause the bolt head to bear against the bounding wall of said hole and draw the portion of said sheeting adjacent said hole bounding wall into the adjacent part of said bore of said forming element and form a seating skirt for only a part of said bolt head and providing a part of said bolt head extending exteriorly of the other face of said sheeting, and abrading away the part of said head exteriorly of the other face of said sheeting so that it is flush with said other sheeting face.

3. The method for filling a hole in installed metal sheeting, which comprises positioning a forming element having a bore extending therethrough from one end to the other end thereof so that one end of the element is adjacent one face of said sheeting with the bore in registry with said hole, the bore of said element being of a diameter greater than said hole, inserting in said hole a bolt having a shank and an inverted frusto-conically shaped head on one end thereof so that the head is adjacent the other face of said sheeting with the shank extending through said hole and the bore of said element and having the portion of the shank adjacent the other end projecting beyond said element, the part of the bore of said element adjacent said sheeting one face being of inverted frusto-conical shape of larger cross-sectional area than that of said bolt head, applying a drawing force to the projecting other end portion of said shank of a magnitude such as to cause the bolt head to bear against the bounding wall of said hole and draw the portion of said sheeting adjacent said hole bounding wall into said frusto-conical shaped part of said bore of said forming element and form a seating skirt for only a part of said bolt head and providing a part of said bolt head extending exteriorly of the other face of said sheeting, and abrading the part of said head exteriorly of the other face of said sheeting so that it is flush with said other sheeting face.

References Cited in the file of this patent
UNITED STATES PATENTS

| | | |
|---|---|---|
| 759,834 | Steele | May 10, 1904 |
| 1,986,981 | Ross | Jan. 8, 1935 |
| 2,395,348 | Sherman | Feb. 19, 1946 |
| 2,631,360 | Sanford | Mar. 17, 1953 |